United States Patent
Fukui et al.

(10) Patent No.: US 11,959,188 B2
(45) Date of Patent: Apr. 16, 2024

(54) COATING METHOD FOR CATIONIC ELECTRODEPOSITION COATING MATERIAL

(71) Applicant: KANSAI PAINT CO., LTD., Amagasaki (JP)

(72) Inventors: Takamasa Fukui, Hiratsuka (JP); Yuya Miyoshi, Hiratsuka (JP); Akira Suehiro, Hiratsuka (JP)

(73) Assignee: KANSAI PAINT CO., LTD., Amagasaki (JP)

( * ) Notice: Subject to any disclaimer, the term of this patent is extended or adjusted under 35 U.S.C. 154(b) by 860 days.

(21) Appl. No.: 16/971,363

(22) PCT Filed: Feb. 20, 2019

(86) PCT No.: PCT/JP2019/006344
§ 371 (c)(1),
(2) Date: Aug. 20, 2020

(87) PCT Pub. No.: WO2019/163833
PCT Pub. Date: Aug. 29, 2019

(65) Prior Publication Data
US 2020/0399777 A1 Dec. 24, 2020

(30) Foreign Application Priority Data
Feb. 23, 2018 (JP) .................. 2018-030957

(51) Int. Cl.
*C25D 9/02* (2006.01)
*C09D 5/44* (2006.01)
*C09D 163/00* (2006.01)

(52) U.S. Cl.
CPC ............. *C25D 9/02* (2013.01); *C09D 5/4438* (2013.01); *C09D 5/4453* (2013.01); *C09D 163/00* (2013.01)

(58) Field of Classification Search
None
See application file for complete search history.

(56) References Cited

U.S. PATENT DOCUMENTS

| | | | |
|---|---|---|---|
| 3,984,299 A | 10/1976 | Jerabek | |
| 4,017,438 A | 4/1977 | Jerabek et al. | |
| 4,761,212 A | 8/1988 | Watanabe et al. | |
| 4,818,356 A * | 4/1989 | Geist ..................... | C25D 13/22 524/901 |
| 5,124,399 A | 6/1992 | Yabuta et al. | |
| 2002/0027077 A1 | 3/2002 | Sakamoto et al. | |
| 2003/0054193 A1 | 3/2003 | McCollum et al. | |
| 2007/0173602 A1 * | 7/2007 | Brinkman ............... | C09J 133/14 524/592 |
| 2008/0032057 A1 * | 2/2008 | Havlin ..................... | B05D 7/14 106/287.35 |
| 2013/0330561 A1 | 12/2013 | Schipfer et al. | |

FOREIGN PATENT DOCUMENTS

| | | |
|---|---|---|
| CN | 1551907 A | 12/2004 |
| CN | 101012291 A | 8/2007 |
| JP | 59-43013 A | 3/1984 |
| JP | 4-39322 A | 2/1992 |
| JP | 6-41788 A | 2/1994 |
| JP | 7-292496 A | 11/1995 |
| JP | 7-300698 A | 11/1995 |
| JP | 8-120494 A | 5/1996 |
| JP | 8-337750 A | 12/1996 |
| JP | 10-120947 A | 5/1998 |
| JP | 10-195349 A | 7/1998 |
| JP | 2002-159909 A | 6/2002 |
| JP | 2004-27255 A | 1/2004 |
| JP | 2004141795 A * | 5/2004 |
| JP | 2006-239651 A | 9/2006 |
| JP | 2009-91594 A | 4/2009 |
| JP | 2009091594 A * | 4/2009 |
| JP | 2014-512939 A | 5/2014 |
| WO | 2017/051900 A1 | 3/2017 |

OTHER PUBLICATIONS

Chinese Office Action and Search Report for Chinese Application No. 201980014751.X, dated Jan. 26, 2022, with English translation of Chinese Office Action.
International Search Report, issued in PCT/JP2019/006344, dated May 7, 2019.
Chinese Office Action for Chinese Application No. 201980014751.X, dated Jul. 6, 2022, with an English translation.
Extended European Search Report for European Application No. 19757380.1, dated Dec. 16, 2021.

* cited by examiner

*Primary Examiner* — Louis J Rufo
(74) *Attorney, Agent, or Firm* — Birch, Stewart, Kolasch & Birch, LLP

(57) ABSTRACT

A coating method for a cationic electrodeposition coating material includes steps for immersing a metal object to be coated in a first solution bath, a second solution bath and a third solution bath, and wherein: at least one step among the three steps is cationic electrodeposition coating that is accompanied by application of a current; a coating film which is formed through the three steps contains at least a base resin component (A), a reaction component (B) and a catalyst (C); and the first solution bath, the second solution bath and the third solution bath contain one or a combination of two of the base resin component (A), the reaction component (B) and the catalyst (C).

16 Claims, No Drawings

COATING METHOD FOR CATIONIC
ELECTRODEPOSITION COATING
MATERIAL

TECHNICAL FIELD

The present invention relates to a coating method for a cationic electrodeposition coating material.

BACKGROUND ART

Conventionally, cationic electrodeposition coating materials have excellent application workability and form coating films with superior corrosion resistance. They have thus been widely used for automotive parts, electric equipment parts and other industrial machinery, which are required to have such properties.

In general, the cationic electrodeposition coating materials are provided in the form of a mixture of two components, i.e., a resin emulsion component in which resin components comprising a cationic resin (e.g., an amino group-containing epoxy resin) and a curing agent (also called "crosslinking agent"; e.g., a blocked polyisocyanate compound) are mixed and dispersed in an aqueous medium, and a pigment dispersion paste component containing a pigment dispersed with a resin for pigment dispersion. Such coating material is used as a coating bath, and a current is applied using an article to be coated as a cathode and a counter electrode as an anode to form a deposited coating film on the article to be coated. The deposited coating film is heated to form a crosslink-cured coating film.

The heating temperature for forming the aforementioned coating film is usually higher than 160° C. However, it has been required for energy cost reduction to heat at a low temperature (0 to 130° C., preferably 5 to 100° C., more preferably 10 to 80° C.). This is called low-temperature baking.

The low-temperature baking (or cold dry curing) is commonly performed using a low-temperature curable blocked polyisocyanate compound as a curing agent. For example, Patent Document 1 discloses that low-temperature curing is performed using an oxime-blocked isocyanate-containing cationic electrodeposition coating material. Patent Document 2 discloses a low-temperature-baking electrodeposition coating material that is baked at a temperature of 100 to 160° C. and that oxime-blocked and lactam-blocked polyisocyanate compounds can dissociate (react) at relatively low temperature. Patent Document 3 discloses that the coating material can be cured at a low temperature of 120° C. or less by using a self-crosslinking resin that contains a specific blocked isocyanate group and can be used as a cationic electrodeposition coating material.

Furthermore, Patent Document 4 discloses a method for forming a coating film by low temperature baking, comprising performing electrodeposition coating using a base resin (an amine-added epoxy resin), performing electrodeposition coating using an aqueous dispersion of a blocked polyisocyanate curing agent to which water dispersibility is imparted, and drying the resulting coating film by heating at 60 to 150° C.

CITATION LIST

Patent Literature

[Patent Literature 1] Japanese Unexamined Patent Application Publication No. H10(1998)-120947
[Patent Literature 2] Japanese Unexamined Patent Application Publication No. H7(1995)-300698
[Patent Literature 3] Japanese Unexamined Patent Application Publication No. H4(1992)-39322
[Patent Literature 4] Japanese Unexamined Patent Application Publication No. 2004-27255

SUMMARY OF THE DISCLOSURE

Technical Problem

However, there are cases in which the long-term storage stability (bath stability) is insufficient in the electrodeposition coating material with a high reactivity at low temperatures as described in Patent Documents 1 to 3 above, resulting in, for example, poor finished appearance and corrosion resistance of the coating film. In addition, in the method for forming a coating film described in Patent Document 4 above, since coating materials and coating are separately used for the base resin and the curing agent, the storage stability (bath stability) of the coating materials is improved. However, the curability at low temperatures is not sufficient.

The present disclosure has been developed in view of the foregoing circumstances. The present disclosure provides a coating method for a cationic electrodeposition coating material with superior storage stability as well as superior low-temperature curability, corrosion resistance and finished appearance of a coating film.

Solution to the Problem

The present inventors conducted extensive research to solve the above-mentioned problems and found that the problems can be solved by the following methods, thereby accomplishing the present invention:

a coating method for a cationic electrodeposition coating material, in which a metallic article to be coated is coated by cationic electrodeposition, the method including: a step of immersing the metallic article to be coated in a first solution bath, a step of immersing the metallic article to be coated in a second solution bath, and a step of immersing the metallic article to be coated in a third solution bath; at least one of the three steps including a cationic electrodeposition coating in which a current is applied; a coating film formed through the three steps containing at least: a base resin component (A), a reaction component (B) and a catalyst (C); and the first solution bath, the second solution bath and the third solution bath containing the base resin component (A), the reaction component (B) and the catalyst (C) in a combination of one or two of the components, or a coating method for a cationic electrodeposition coating material, in which a metallic article to be coated is coated by cationic electrodeposition, the method including: a step of immersing the metallic article to be coated in a first solution bath and a step of immersing the metallic article to be coated in a second solution bath; at least one of the two steps including a cationic electrodeposition coating in which a current is applied, a coating film formed through the two steps containing at least: a base resin component (A), a reaction component (B) and a catalyst (C); and the first solution bath and the second solution bath containing the base resin component (A), the reaction component (B) and the catalyst (C) in a combination of one or two of the components or in a combination of two of the components.

In other words, the present disclosure provides a coated item obtained by coating an article to be coated by electrodeposition of a below-described cationic electrodeposition coating material.

Item 1: A coating method for a cationic electrodeposition coating material, in which a metallic article to be coated is coated by cationic electrodeposition, the method including: a step of immersing the metallic article to be coated in a first solution bath, a step of immersing the metallic article to be coated in a second solution bath and a step of immersing the metallic article to be coated in a third solution bath; at least one of the three steps including a cationic electrodeposition coating in which a current is applied; a coating film formed through the three steps containing at least: a base resin component (A), a reaction component (B) and a catalyst (C); and the first solution bath, the second solution bath and the third solution bath containing the base resin component (A), the reaction component (B) and the catalyst (C) in a combination of one or two of the components.

Item 2: A coating method for a cationic electrodeposition coating material, in which a metallic article to be coated is coated by cationic electrodeposition, the method including: a step of immersing the metallic article to be coated in a first solution bath and a step of immersing the metallic article to be coated in a second solution bath; at least one of the two steps including a cationic electrodeposition coating in which a current is applied, a coating film formed through the two steps containing at least: a base resin component (A), a reaction component (B) and a catalyst (C); and the first solution bath and the second solution bath containing the base resin component (A), the reaction component (B) and the catalyst (C) in a combination of one or two of the components or in a combination of two of the components.

Item 3: The coating method for the cationic electrodeposition coating material according to Item 1 or 2 above, in which the combination of the base resin component (A), the reaction component (B) and the catalyst (C) is respectively a Michael addition reaction acceptor component, a Michael addition reaction donor component and a Michael addition reaction catalyst; or the Michael addition reaction donor component, the Michael addition reaction acceptor component and the Michael addition reaction catalyst.

Item 4: The coating method for the cationic electrodeposition coating material according to Item 1 or 2 above, in which the combination of the base resin component (A), the reaction component (B) and the catalyst (C) is respectively an epoxy group-containing component, a thiol group-containing component and a catalyst; or the thiol group-containing component, the epoxy group-containing component and the catalyst.

Item 5: The coating method for the cationic electrodeposition coating material according to any one of Items 1 to 4 above, further including a step of water washing after at least one of the steps.

Item 6: The coating method for the cationic electrodeposition coating material according to any one of Items 1 to 5 above, in which the catalyst (C) is a microencapsulated catalyst.

Item 7: The coating method for the cationic electrodeposition coating material according to any one of Items 1 to 6 above, further including a step of curing the formed coating film at a temperature of 130° C. or less.

Item 8: The coating method for the cationic electrodeposition coating material according to any one of Items 1 to 6 above, further including a step of curing the formed coating film by electromagnetic-induction heating.

Advantageous Effects of the Disclosure

The coating method for a cationic electrodeposition coating material of the present disclosure provides superior curability, finished appearance and corrosion resistance of the obtained coating film, even if cured at an ordinary temperature or a low temperature, while ensuring good coating stability (bath stability).

Specifically, automobile bodies coated using the coating method of the present disclosure have superior finished appearance and less corrosion or deterioration of the coating film, even when the car is driven for a long period of time in an environment where snow-melting salts have been spread. Moreover, the coating method for the cationic electrodeposition material of the present disclosure also provides superior storage stability over a long period of time.

DESCRIPTION OF EMBODIMENTS

One embodiment of the present disclosure is (1) a coating method for a cationic electrodeposition coating material, in which a metallic article to be coated is coated by cationic electrodeposition, the method including: a step of immersing the metallic article to be coated in a first solution bath, a step of immersing the metallic article to be coated in a second solution bath and a step of immersing the metallic article to be coated in a third solution bath; at least one of the three steps including a cationic electrodeposition coating in which a current is applied; a coating film formed through the three steps containing at least: a base resin component (A), a reaction component (B) and a catalyst (C); and the first solution bath, the second solution bath and the third solution bath containing the base resin component (A), the reaction component (B) and the catalyst (C) in a combination of one or two of the components.

Another embodiment of the present disclosure is (2) a coating method for a cationic electrodeposition coating material, in which a metallic article to be coated is coated by cationic electrodeposition, the method including: a step of immersing the metallic article to be coated in a first solution bath and a step of immersing the metallic article to be coated in a second solution bath; at least one of the two steps including a cationic electrodeposition coating in which a current is applied, a coating film formed through the two steps containing at least: a base resin component (A), a reaction component (B) and a catalyst (C); and the first solution bath and the second solution bath containing the base resin component (A), the reaction component (B) and the catalyst (C) in a combination of one or two of the components or in a combination of two of the components.

In other words, while a conventional cationic electrodeposition coating is performed in one solution of the coating material (in one step), the present disclosure provides a coating method for a cationic electrodeposition coating in which the coating material is divided into two solutions (two steps) or three solutions (three steps), and an article to be coated is immersed for coating in these coating materials. Further, an electric current is applied in at least one step of the two or three steps. Among them, employing the two solutions (the two steps) is preferable from the viewpoint of reducing steps as much as possible.

Herein, a solution of which components are divided into two solutions or three solutions may be collectively referred to as a cationic electrodeposition coating material; and a multitiered coating film coated through the two steps or the three steps may be collectively referred to as a cationic electrodeposition coating film.

In the present disclosure, "aqueous solvent" means a solvent whose main component is water and/or a hydrophilic solvent. Examples of the hydrophilic solvent include ethylene glycol, ethylene glycol monoalkyl ether (e.g., methyl ether, ethyl ether, butyl ether, etc.), diethylene glycol, diethylene glycol monoalkyl ether (e.g., methyl ether, ethyl ether, butyl ether, etc.), glyme-based solvents (e.g., ethylene glycol dimethyl ether, etc.), diglyme-based solvents (e.g., diethylene glycol dimethyl ether, etc.), alcohol-based solvents (e.g., methyl alcohol, ethyl alcohol, propyl alcohol, n-butyl alcohol, etc.), propylene glycol, propylene glycol monoalkyl ether (e.g., methyl ether, ethyl ether, butyl ether, etc.), dipropylene glycol, dipropylene glycol monoalkyl ether (e.g., methyl ether, ethyl ether, butyl ether, etc.). These may be used alone or in combination of two or more.

In the present disclosure, "compound" is a generic name including monomers, oligomers, polymers (resins), etc.

Hereinafter, the present disclosure will be described in detail.

(1) Step of Sequentially Immersing a Metallic Article to be Coated in a First Solution Bath, a Second Solution Bath and Third Solution Bath One embodiment of a coating method of the present disclosure is a coating method for a cationic electrodeposition coating material, in which a metallic article to be coated is coated by cationic electrodeposition, the method including: a step of immersing the metallic article to be coated in a first solution bath, a step of immersing the metallic article to be coated in a second solution bath and a step of immersing the metallic article to be coated in a third solution bath; at least one of the three steps including a cationic electrodeposition coating in which a current is applied; a coating film formed through the three steps containing at least: a base resin component (A), a reaction component (B) and a catalyst (C); and the first solution bath, the second solution bath and the third solution bath containing the base resin component (A), the reaction component (B) and the catalyst (C) in a combination of one or two of the components.

In other words, each of (A), (B) and (C) is separately contained in the first solution bath, the second solution bath and the third solution bath; or (A), (B) and (C) are contained in the first solution bath, the second solution bath and the third solution bath in a combination of one or two of the components. However, all of the three components are not contained in one solution bath, substantially. Note that "substantially" herein is intended to exclude a case where (A), (B) and (C) are slightly contained within a range that does not affect the performance. Specifically, the content of the least and third component is less than 0.1% by mass relative to a resin solids content of each solution bath.

The base resin component (A) is a main resin component of a resin constituting the coating material. The reaction component (B) is a component that reacts (crosslinks) with the base resin. The reaction component (B) has a weight-average molecular weight usually between 100 and 1,000,000, and preferably between 150 and 100,000.

It is preferable that each solution of the first solution bath, the second solution bath and the third solution bath contains at least one kind of the component shown in any one of the combinations 1 to 6 of Table 1 below.

As long as each solution bath contains the component shown in the combinations of Table 1, the solution bath may contain another component. For example, "Combination 1" in Table 1 includes a case where the first solution bath contains "the base resin component (A)"; the second solution bath contains "the reaction component (B)"; and the third solution bath contains "the catalyst (C) and the reaction component (B)". In other words, the three solution baths separately contain (A), (B) and (C) as well as one of the other two components. It is preferable that a cationic electrodeposition coating in which a current is applied is performed in the solution baths containing the base resin component (A) and/or the reaction component (B).

TABLE 1

| Combination | First solution bath | Second solution bath | Third solution bath |
| --- | --- | --- | --- |
| 1 | Base resin component (A) | Reaction component (B) | Catalyst (C) |
| 2 | Base resin component (A) | Catalyst (C) | Reaction component (B) |
| 3 | Reaction component (B) | Base resin component (A) | Catalyst (C) |
| 4 | Reaction component (B) | Catalyst (C) | Base resin component (A) |
| 5 | Catalyst (C) | Base resin component (A) | Reaction component (B) |
| 6 | Catalyst (C) | Reaction component (B) | Base resin component (A) |

The base resin component (A), the reaction component (B) and the catalyst (C) are combined in any one of Combinations I to IV in Table 2 below.

TABLE 2

| Combination | Base resin component (A) | Reaction component (B) | Catalyst (C) |
| --- | --- | --- | --- |
| I | Michael addition reaction Accepter component | Michael addition reaction Donor component | Michael addition reaction Catalyst |
| II | Michael addition reaction Donor component | Michael addition reaction Accepter component | Michael addition reaction Catalyst |
| III | Epoxythiol reaction Epoxy group-containing compound | Epoxythiol reaction Thiol group-containing compound | Epoxythiol reaction Catalyst |
| IV | Epoxythiol reaction Thiol group-containing compound | Epoxythiol reaction Epoxy group-containing compound | Epoxythiol reaction Catalyst |

In the above steps of immersing in the order of the first solution bath, the second solution bath and the third solution bath, other steps (such as water washing, drying or immersing) may be put between or before and after the steps. For example, a water washing step may be provided after each of the steps so that each of the components does not mix into the solution bath of the following step. The water washing step may use water such as pure water, clean water, industrial water, ultrafiltrate (UF filtrate) or reverse osmosis permeate water (RO water). The water washing may be performed once or several times. A method for the water washing may be immersing, showering, spraying or the like selected without particular limitation, any of which can be preferably used.

Note that the catalyst (C) is preferably contained in the second solution bath or in the third solution bath; more preferably in the third solution bath. This is for preventing the catalyst (C) from mixing into the other solution baths as much as possible. Among the combinations of Table 1 above, Combinations 1 to 4 are preferable. Combination 1 or 3 is more preferable.

Michael Addition Reaction Donor Component

The Michael addition reaction donor component is at least one active hydrogen group-containing compound selected from the group consisting of an active methylene group-containing compound, a primary and/or secondary amino group-containing compound, a thiol group (mercapto group)-containing compound and a hydroxyl group-containing compound. Among these, the active hydrogen group is preferably at least one of the active methylene group-containing compound and the primary and/or secondary amino group-containing compound.

The active hydrogen group-containing compound may be any selected without particular limitation, as long as the compound contains one or more (preferably a plurality of) donor components (active hydrogen groups) per molecule. Examples thereof include active methylene group-containing compounds such as methylacetoacetate, ethylacetoacetate, t-butylacetoacetate, 2-ethylhexylacetoacetate, laurilacetoacetate, acetoacetanilide, 2-acetoacetoxyethyl methacrylate, allylacetoacetate, butane diol diacetoacetate, 1,6-hexanediol diacetoacetate, neopentyl glycol diacetoacetate, cyclohexanedimethanol diacetoacetate, ethoxylated bisphenol A diacetoacetate, trimethylolpropanetriacetoacetate, glycine triacetoacetate, polycaprolactone triacetoacetate, pentaerythritol tetraacetoacetate; primary and/or secondary amino group-containing compounds such as ethylenediamine, diethylenetriamine, dipropylenetriamine, triethylenetetramine, tripropylenetetramine, tetraethylenepentamine, tetrapropylene pentamine; thiol group (mercapto group)-containing compounds such as pentaerythritol tetrakis(3-mercaptopropionate), trimethylolpropanetris (3-mercaptopropionate), tris-[(3-mercaptopropyonyloxy)-ethyl]-isocyanurate, tetraethylene glycol bis (3-mercaptopropionate), dipentaerythritol hexakis(3-mercaptopropionate), pentaerythritol tetrakis (3-mercaptobutylate), trimethylolpropane tris (3-mercaptobutylate); hydroxyl group-containing compounds such as alkanediol, poly(oxyalkylene) glycol, glycerol, diglycerol, trimethylolpropane, ditrimethylol propane, pentaerythritol, dipentaerythritol; or reactants thereof. These may be used alone or in combination of two or more.

As the active hydrogen group-containing compound, compounds whose skeleton is a resin may also be preferably used. Specific examples include the following (Example 1) to (Example 5).

(Example 1) An acrylic resin obtained by copolymerizing an active hydrogen group-containing acrylic monomer with another acrylic monomer. Examples of the active hydrogen group-containing acrylic monomer include 2-ethoxymalonyloxyet hyl(meth)acrylate, 2-acetoacetoxyethyl (meth) acrylate, 2-cyanoacetoxyethyl (meth)acrylate, N-(2-cyanoacetoxyethyl)acrylamide, N-(2-propionylacetoxybutyl) acrylamide, N-(4-acetoacetoxymethylbenzyl)acrylamide, N-(2-acetoacetylaminoethyl)acrylamide, 2-(N-acetoacetylaminoethyl)(meth)acrylate, 2-hydroxyethyl (meth)acrylate, 2-hydroxypropyl (meth)acrylate, 3-hydroxypropyl (meth)acrylate, 4-hydroxybutyl (meth)acrylate, N-hydroxymethyl (meth)acrylamide, and (meth) acrylate having a polyoxyalkylene chain in which the molecular terminal is a hydroxyl group.

(Example 2) A polyester resin obtained by polycondensation between a dicarboxylic acid compound containing malonic acid and a diol compound.

(Example 3) An epoxy resin obtained by addition condensation between a dicarboxylic acid compound containing malonic acid and a diglycidyl compound.

(Example 4) A polyamide resin obtained by polycondensation between a dicarboxylic acid compound containing malonic acid and a diamine compound.

(Example 5) A modified resin obtained by adding an active hydrogen group-containing compound to a resin (e.g., an acrylic resin, an epoxy resin, a polyester resin, a urethane resin, a phenolic resin). Among them, the resin is preferably the active hydrogen group modified epoxy resin and/or the active hydrogen group modified acrylic resin. The active hydrogen group modified epoxy resin is more preferable. Here, the active hydrogen group modified resin means a resin containing an active hydrogen group.

Suitable as the epoxy resin used for forming the active hydrogen group modified epoxy resin of (Example 5) is a resin that has: at least one epoxy group, preferably two or more epoxy groups, per molecule; and a molecular weight, i.e., a number average molecular weight of at least 300, preferably within a range of 400 to 4,000, and more preferably 800 to 2,500; and an epoxy equivalent weight of at least 160, preferably within a range of 180 to 2,500, and more preferably 400 to 1,500. Such epoxy resin may be a resin obtained by reaction of a polyphenolic compound with epihalohydrin (e.g., epichlorohydrin).

The polyphenolic compound includes, e.g., bis(4-hydroxyphenyl)-2,2propane [bisphenol A], bis (4-hydroxyphenyl) methane [bisphenol F], bis (4-hydroxycyclohexyl) methane [hydrogenated bisphenol F], 2,2-bis (4-hydroxycyclohexyl) propane [hydrogenated bisphenol A], 4,4'-dihydroxybenzophenone, bis (4-hydroxyphenyl)-1,1-ethane, bis (4-hydroxyphenyl)-1,1-isobutane, bis (4-hydroxy-3-tert-butyl-phenyl)-2,2-propane, bis (2-hydroxynaphthyl) methane, tetra (4-hydroxyphenyl)-1,1,2,2-ethane, 4,4'-dihydroxydiphenyl sulfone, phenol novolac, and cresol novolac.

In addition, the epoxy resin obtained by reaction of a polyphenol compound and epihalohydrin is preferably a resin represented by the following chemical formula which is derived from bisphenol A.

[Chemical formula 1]

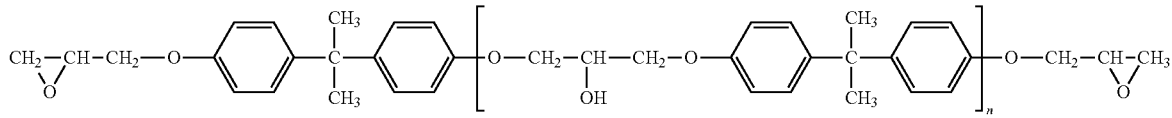

Here, 0 to 8 is a preferable range for n.

Examples of commercially available products of the epoxy resin include products sold under the trade names of jER828EL, jER1002, jER1004 and jER1007 from Mitsubishi Chemical Corporation.

As the above-mentioned active hydrogen group modified epoxy resin, an epoxy resin containing polyalkylene oxide chains in its resin skeleton may be used. Usually, such epoxy resin can be obtained, e.g., by (α) a method of introducing a polyalkylene oxide chain by reaction of an epoxy resin having at least one, preferably two or more epoxy groups with alkylene oxide or polyalkylene oxide; or (β) a method of introducing a polyalkylene oxide chain by reaction of the above polyphenolic compound with a polyalkylene oxide having at least one, preferably two or more epoxy groups. Alternatively, epoxy resins already containing polyalkylene oxide chains may be used (see, e.g., Japanese Unexamined Patent Application Publication No. H8-337750).

An alkylene group in the polyalkylene oxide chains is: preferably a $C_{2-8}$ alkylene group; more preferably an ethylene group, a propylene group, or a butylene group; and particularly preferably a propylene group.

As the epoxy resin other than the bisphenol type epoxy resin, t-butylcatechol type epoxy resin, phenol novolac type epoxy resin, cresol novolac type epoxy resin can also be suitably used. These resins can be used alone or in combination of two or more. Commercial products of novolac type epoxy resins include, for example, phenol novolac resin DEN-438 manufactured by Dow Chemical Japan Limited; and cresol novolac resin YDCN-703 manufactured by Tohto Kasei Co., Ltd.

The active hydrogen group modified epoxy resin preferably have a primary, secondary and/or tertiary amino group from the viewpoint of the coating properties of the cationic electrodeposition coating. When the primary or secondary amino group is used, it also has effects as a donor component of Michael addition reaction in addition to the coating properties.

Examples of the active hydrogen group modified epoxy resin having an amino group added include: (1) adducts between epoxy resins and: primary mono- and polyamines; secondary mono- and polyamines; or primary and secondary mixed polyamines (see, e.g., U.S. Pat. No. 3,984,299); (2) adducts between epoxy resins and secondary mono- and polyamines having ketiminated primary amino groups (see, e.g., U.S. Pat. No. 4,017,438); and (3) reactants obtained by etherification between epoxy resins and hydroxy compounds having ketiminated primary amino groups (see, e.g., Japanese Unexamined Patent Application Publication No. S59-43013).

Examples of the primary mono- and polyamines, the secondary mono- and polyamines or the primary and secondary mixed polyamines which are used in manufacturing of the amino group-containing epoxy resins of (1) include mono- or di-alkylamines such as monomethylamine, dimethylamine, monoethylamine, diethylamine, monoisopropylamine, diisopropylamine, monobutylamine, dibutylamine; and alkanolamine such as monoethanolamine, diethanolamine, mono(2-hydroxypropyl)amine and monomethyl aminoethan ol; and alkylene polyamine such as ethylenediamine, propylenediamine, butylenediamine, hexamethylendiamine, diethylenetriamine and triethylenetetramine.

Examples of the secondary mono- and polyamines having ketiminated primary amino groups used for manufacturing of the amino group-containing epoxy resins of (2) include ketimined products generated by reaction of a ketone compound and, e.g., diethylenetriamine among the primary and secondary mixed polyamines used in manufacturing of the amine-appended epoxy resin of (1).

Examples of the ketiminated primary amino group-containing hydroxy compound used in manufacturing of the amino group-containing epoxy resins in (3) include: hydroxy group-containing ketiminated products obtained by reacting a ketone compound with a primary amino group- and hydroxy group-containing compound (such as monoethanolamine or mono(2-hydroxypropyl)amine) among the primary mono- and polyamines, secondary mono- and polyamines, or primary and secondary mixed polyamines used in manufacturing of the amino group-containing epoxy resin in (1).

The active hydrogen group modified epoxy resin can be manufactured by adding an active hydrogen group-containing compound having an active hydrogen group other than the above amino groups.

The active hydrogen group-containing compound may be selected without particular limitation, as long as the compound has a reactive functional group (e.g., a carboxyl group or a primary or a secondary amino group) capable of reacting with an epoxy group other than the active hydrogen group (a donor component). Examples thereof include active methylene group-containing compounds such as malonic acid, alkyl malonate, acetoacetic acid, isobutyrylacetic acid, benzoylacetic acid and propionylacetic acid; thiol group-containing compounds such as thioglycolic acid, thiomalic acid, thiosalicylic acid, dithiosalicylic acid, mercaptopropionic acid and 3-mercaptopropionic acid; hydroxyl group-containing compounds such as lactic acid, glycolic acid, dimethylolpropionic acid, hydroxybutyric acid, glyceric acid, dimethylolbutanoic acid, salicylic acid, mandelic acid, ε-caprolactone, monoethanolamine. These may be used alone or in combination of two or more.

The active hydrogen group modified epoxy resins can be modified by a modifier, as appropriate. The modifiers are not particularly limited, as long as it has reactivity with epoxy resins. The modifiers may be polyamidoamines, polycarboxylic acids, fatty acids, polyisocyanate compounds, polyisocyanate compound reacted compounds, acrylic monomers, acrylic monomer polymerized compounds, xylene formaldehyde compounds or epoxy compounds. These modifiers may be used alone or in combination of two or more.

The addition reaction of the above amine compounds, the active hydrogen group-containing compounds and the modifiers to epoxy resins can usually be performed in a suitable solvent at a temperature of about 80 to about 170° C. (preferably about 90 to about 150° C.) for about 1 to 6 hours (preferably about 1 to 5 hours).

The reaction solvent includes hydrocarbons such as toluene, xylene, cyclohexane and n-hexane; esters such as methyl acetate, ethyl acetate and butyl acetate; ketones such as acetone, methyl ethyl ketone, methyl isobutyl ketone and methyl amyl ketone; amides such as dimethylformamide and dimethylacetamide; alcohols such as methanol, ethanol, n-propanol and iso-propanol; ether alcohol compounds such as ethyleneglycol monobutyl ether and diethylene glycol monoethyl ether; or mixtures thereof.

The active hydrogen group modified epoxy resin may preferably have a number average molecular weight usually within a range of 1,000 to 50,000, particularly within a range of 1,300 to 20,000, and further particularly within a range of 1,600 to 10,000 from the viewpoints of the finished appearance, the corrosion resistance and the like.

The amine value of the active hydrogen group modified epoxy resin is usually 10 mgKOH/g or more, preferably within a range of 20 to 200 mgKOH/g, and more preferably within a range of 30 to 150 mgKOH/g based on the resin solids content. The amine value herein is measured according to JIS K 7237-1995 standard. All amine values herein are amine values of resin solids (mgKOH/g).

Also, the number average molecular weight and the weight-average molecular weight herein are values calculated by converting the retention time (retention volume) measured using a gel permeation chromatograph (GPC) to the molecular weight of polystyrene, using the retention time (retention volume) of a standard polystyrene with a known molecular weight measured under the same conditions. Specifically, the gel permeation chromatograph may be "HLC8120GPC" (trade name, manufactured by Tosoh Corporation Co., Ltd.). The columns may be four columns of "TSKgel G-4000HXL", "TSKgel G-3000HXL", "TSKgel G-2500HXL" and "TSKgel G-2000HXL" (trade names, all manufactured by Tosoh Corporation Co., Ltd.). The measurements can be performed under the conditions where the mobile phase is tetrahydrofuran; the measurement temperature is 40° C.; the flow rate is 1 mL/min; and a RI detector is used.

The active hydrogen group modified epoxy resin thus obtained enables the active hydrogen group modified epoxy resin solution to be neutralized with acid compounds. The active hydrogen group modified epoxy resin can disperse in an aqueous solvent.

The acid compound may be any known acid compound selected without particular limitation. Specific examples thereof include: inorganic acids such hydrochloric acid, nitric acid, phosphoric acid and sulfamic acid; and organic acids including carboxylic acid compounds such as formic acid, acetic acid, propionic acid and lactic acid. These acid compounds may be used alone or in combination of two or more. Among them, organic acids are preferable. In particular, carboxylic acid compounds are more preferable.

As an alternative dispersion method, an emulsifier may also be used. The emulsifier may be selected without particular limitation. Examples thereof include nonionic, cationic and anionic emulsifiers. These may be used alone or in combination of two or more. Among them, nonionic and/or cationic emulsifiers are preferable. Cationic emulsifiers are more preferable.

Michael Addition Reaction Acceptor Component

The Michael addition reaction acceptor component is a compound having at least one α, β-unsaturated carbonyl group selected from the group including (meth) acryloyloxy group-containing compounds, (meth) acrylamide group-containing compounds, maleic acid-based compounds, fumaric acid-based compounds and itaconic acid-based compounds.

The compound having the α, β-unsaturated carbonyl group may be selected without particular limitation, as long as it contains one or more (preferably a plurality of) acceptor components (α, β-unsaturated carbonyl groups) per molecule. Examples of the above (meth) acryloyloxy group-containing compounds include: diacrylate such as ethylene glycol diacrylate, propylene glycol diacrylate, diethylene glycol diacrylate, dipropylene glycol diacrylate, triethylene glycol diacrylate, tripropylene glycol diacrylate, tetraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexan edimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, acrylated epoxy diacrylate, allyl urethane diacrylate, aliphatic urethane diacrylate and polyester diacrylate; triacrylate such as trimethylolpropane triacrylate, glycerol triacrylate, ethoxylated trimethylolpropane triacrylate, propoxylated trimethylolpropane triacrylate, tris (2-hydroxyethyl) isocyanurate triacrylate, ethoxylated glycerol triacrylate, propoxylated glycerol triacrylate, pentaerythritol triacrylate, allylurethane triacrylate, aliphatic urethane triacrylate, melamine triacrylate, aliphatic epoxy triacrylate, epoxy novolactoriacrylate and polyester triacrylate; tetraacrylate such as di-trimethylolpropane tetraacrylate, pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, allylurethane tetraacrylate, aliphatic urethane tetraacrylate, melamine tetraacrylate and epoxy novolac tetraacrylate; and pentaacrylate such as dipentaerythritol pentaacrylate and melamine pentaacrylate. These may be used alone or in combination of two or more.

As the α,β-unsaturated carbonyl group-containing compound, it is also suitable to use a compound whose skeleton is a resin. Such compound may be manufactured by a method, e.g., of: synthesizing of polyester resins, acrylic resins, epoxy resins and the like; and (1) reacting glycidyl (meth) acrylates with the carboxyl group of the resins, (2) reacting isocyanatoethyl (meth) acrylates with the hydroxyl group of the resins, or (3) reacting (meth) acrylates, maleates, fumarates, itaconates or the like with the epoxy group of the resins.

The compound may also preferably be: polyester resins obtained by polycondensation reactions of polycarboxylic acid such as (anhydrous) maleic acid, fumaric acid and itaconic acid with polyhydric alcohol such as ethylene glycol, diethylene glycol, propylene glycol, tetramethylene glycol, 1,6-hexanediol, neopentyl glycol, trimethylol propane, glycerine, pentaerythritol; or polyamide resins obtained by polycondensation reactions using polyamines in place of the above polyhydric alcohols. Other examples include, e.g., urethane compounds obtained by reaction of polyfunctional polyisocyanate compounds with compounds having hydroxyl and acryloyl groups (e.g., 2-hydroxyethyl acrylate or 4-hydroxybutyl methacrylate).

Among them, the α, β-unsaturated carbonyl group-modified epoxy resin and/or the α, β-unsaturated carbonyl group-modified acrylic resin are preferable. The α, β-unsaturated carbonyl group-modified epoxy resin is more preferable.

A raw material of the α, β-unsaturated carbonyl group-modified epoxy resin may preferably be the epoxy resin that is described above as the epoxy resin to be used for forming the aforementioned active hydrogen group modified epoxy resin. From the viewpoint of the coating properties of the cationic electrodeposition coating material, it is preferable to add a tertiary amino group to the epoxy resin (it is preferable that no primary and/or secondary amino groups is contained, since they have an effect as a donor component).

The above α, β-unsaturated carbonyl group-modified epoxy resin can be modified by a modifier similarly to the above-mentioned active hydrogen group modified epoxy resin.

The α, β-unsaturated carbonyl group-modified epoxy resin may preferably be the number average molecular weight usually within a range of 1,000 to 50,000, particularly within a range of 1,300 to 20,000, and further particularly within a range of 1,600 to 10,000 from the viewpoints of the finished appearance, the corrosion resistance and the like.

The amine value of the α, β-unsaturated carbonyl group-modified epoxy resin is usually 10 mgKOH/g or more, preferably within a range of 20 to 200 mgKOH/g, and more preferably within a range of 30 to 150 mgKOH/g based on the resin solids content.

The α, β-unsaturated carbonyl group-modified epoxy resin thus obtained enables the α, β-unsaturated carbonyl group-modified epoxy resin solution to be neutralized with an acid compound; and can disperse in an aqueous solvent.

The acid compound may be any known acid compound selected without particular limitation. Specific examples thereof include: inorganic acids such hydrochloric acid, nitric acid, phosphoric acid and sulfamic acid; and organic acids including carboxylic acid compounds such as formic acid, acetic acid, propionic acid and lactic acid. These acid compounds may be used alone or in combination of two or more. Among them, organic acids are preferable. In particular, carboxylic acid compounds are more preferable.

As an alternative dispersion method, an emulsifier may also be used. The emulsifier may be selected without particular limitation. Examples thereof include nonionic, cationic and anionic emulsifiers. These may be used alone or in combination of two or more. Among them, nonionic and/or cationic emulsifiers are preferable. Cationic emulsifiers are more preferable.

Michael Addition Reaction Catalyst (C)

The Michael addition reaction catalyst may be selected without particular limitation from ones known per se as a catalyst for Michael addition reaction. Preferably, the catalyst is at least one compound selected from the group including alkali-metal hydroxides, alkali-metal carbonates, quaternary ammonium compounds, tertiary amine compounds, guanidine compounds, amidine compounds, tertiary phosphine compounds, phosphazene compounds, tertiary sulfonium compounds and quaternary phosphonium compounds. These may be used alone or in combination of two or more.

The Michael addition reaction catalyst is preferably a basic catalyst such as an amidine compound or a guanidine compound from the viewpoint of the performance of the catalyst.

The amidine compounds may be selected without particular limitation from ones known per se. Specific examples thereof include 1,5-diazabicyclo[4,3,0]-nonene-5 (DBN), 1,5-diazabicyclo[4,4,0]-decene-5,1,8-diazabicyclo[5,4,0]-undecene-7 (DBU), 5-hydroxypropyl-1,8-diazabicyclo[5,4,0]-undecene-7 and 5-dibutylamino-1,8-diazabicyclo[5,4,0]-undecene-7.

The guanidine compounds may be selected without particular limitation from ones known per se. Specific examples thereof include 1,3-diphenylguanidine, 1,3-dimethylguanidine and 1,1,3,3-tetramethylguanidine (TMG). These catalysts may be used alone or in combination of two or more.

The Michael addition reaction catalyst may preferably be those having an acid dissociation constant (pKa) of 10 or more, and more preferably of 12 or more, from the viewpoint of the performance of the catalyst.

The basic catalyst preferably is a compound having a molecular weight of 100 or more, more preferably of 200 or more, and still more preferably of 300 or more, from the viewpoints of the finished appearance of the coating material as well as the water resistance of the coating film.

A method for increasing the molecular weight of the basic catalyst may be, in the case of then amidine catalyst or the guanidine catalyst, (1) a method of reacting the primary or secondary amino groups of the amidine catalyst or the guanidine catalyst with an reactive functional group-containing compound such as an epoxy group or an isocyanate group, or (2) a method of reacting the amidine catalyst or the guanidine catalyst with a carbodiimide compound. These methods can be preferably used.

The Michael addition reaction catalyst may be microencapsulated and contained in the coating material.

The blending quantity of Michael addition reaction catalyst may be set such that its catalyst component excluding the resin component is preferably within a range of 0.1 to 10% by mass, and more preferably within a range of 0.5 to 7% by mass, based on the resin solids of the formed coating film.

Epoxythiol Reaction Epoxy Group-Containing Component

As the epoxythiol reaction epoxy group-containing component, any compound known per se may be preferably used without particular limitation, as long as it contains an epoxy group. Specifically, the epoxy resin that is described above as the epoxy resin to be used for forming the aforementioned active hydrogen group modified epoxy resin; or the glycidyl group-containing acrylic resin obtained by copolymerizing a glycidyl group with a monomer having a polymerizable unsaturated group may be preferably used. The epoxy group-containing component preferably contains at least one epoxy group (preferably a plurality of epoxy groups) per molecule. These may be used alone or in combination of two or more.

The epoxythiol reaction epoxy group-containing component may used by being dispersed in an aqueous solvent by: a method of adding amino groups to the resin and emulsifying it; a method of emulsifying with an emulsifier; a method of emulsion polymerization; and/or a method of mixing with another resin component and emulsifying it.

Epoxythiol Reaction Thiol Group-Containing Component

The epoxythiol reaction thiol group-containing component may be any compound known per se selected without particular limitation, as long as it contains a thiol group (a mercapto group). Such component can be preferably used. For example, the compounds that are described above as the thiol group (mercapto group)-containing compound for the aforementioned Michael addition reaction donor component can be preferably used. The epoxythiol reaction thiol group-containing component preferably contains at least one thiol group (mercapto group) (preferably a plurality of thiol groups (mercapto groups)) per molecule. Examples of commercially available products thereof include: pentaerythritol tetrakis (3-mercaptopropionate) [trade name [ADEKA HARDENER EH317] manufactured by ADEKA Corporation]; pentaerythritol tetrakis (3-mercaptobutyrate) [trade name [Karenz MT PEI] manufactured by SHOWA DENKO K.K.]; 1,4-bis(3-mercaptobutyryloxy)butane [trade name [Karenz MT BDI] manufactured by SHOWA DENKO K.K.; 1,3,5-tris(3-mercaptobutyryloxyethyl)-1,3,5-triazine-2,4,6 (1H,3H,5H)-trione [trade name [Karenz MT NRI] manufactured by SHOWA DENKO K.K.]; polyetherpolythiol [[trade name [jERCURE QX11] manufactured by Mitsubishi Chemical Corporation]. These may be used alone or in combination of two or more.

The epoxythiol reaction thiol group-containing component may be obtained by adding the thiol group-containing compound to the resin.

A method for dispersing in an aqueous solvent may preferably be a method of adding an amino group to the resin and emulsify it; a method of emulsifying with an emulsifier; and/or a method of mixing with another resin component and emulsifying it.

Epoxythiol Reaction Catalyst

The epoxythiol reaction catalyst may be selected without particular limitation from ones known per se as a catalyst for reaction between a thiol group and an epoxy group. A preferable example thereof is the basic catalyst which is described above in relation to the aforementioned Michael addition reaction catalyst (C). These may be used alone or in combination of two or more.

A method for dispersing in an aqueous solvent may preferably be a method of adding an amino group to the catalyst and emulsify it; a method of emulsifying with an emulsifier; and/or a method of mixing with another resin component and emulsifying it.

(2) Step for Sequentially Immersing a Metallic Article to be Coated in a First Solution Bath and a Second Solution Bath Another embodiment of the coating method of the present disclosure is a coating method for a cationic electrodeposition coating material, in which a metallic article to be coated is coated by cationic electrodeposition, the method including: a step of immersing the metallic article to be coated in a first solution bath and a step of immersing the metallic article to be coated in a second solution bath; at least one of the two steps including a cationic electrodeposition coating in which a current is applied, a coating film formed through the two steps containing at least: a base resin component (A), a reaction component (B) and a catalyst (C); and the first solution bath and the second solution bath containing the base resin component (A), the reaction component (B) and the catalyst (C) in a combination of one or two of the components or in a combination of two of the components. In other words, (A), (B), and (C) components are contained in the first solution bath and the second solution bath in: a combination of one component and two components; a combination of two components and two components; or a combination of two components and one component.

As long as each solution bath contains the component shown in the combinations of Table 3, the solution bath may contain another component. However, the three components (A), (B) and (C) are not be contained in one solution bath, substantially. The meaning of "substantially" is the same as that described above.

It is preferable that the first solution bath and the second solution bath contain at least one kind of each of the component(s) shown in any one of the combinations 1 to 12 of Table 3 below.

It is preferable that a cationic electrodeposition coating in which a current is applied is performed in the solution baths containing the base resin component (A) and/or the reaction component (B).

TABLE 3

| Combination | First solution bath | Second solution bath |
| --- | --- | --- |
| 1 | Base resin component (A) + Catalyst (C) | Reaction component (B) |
| 2 | Base resin component (A) | Reaction component (B) + Catalyst (C) |
| 3 | Base resin component (A) + Catalyst (C) | Reaction component (B) + Catalyst (C) |
| 4 | Reaction component (B) + Catalyst (C) | Base resin component (A) |
| 5 | Reaction component (B) | Base resin component (A) + Catalyst (C) |
| 6 | Reaction component (B) + Catalyst (C) | Base resin component (A) + Catalyst (C) |
| 7 | Reaction component (B) + Catalyst (C) | Base resin component (A) + Reaction component (B) |
| 8 | Base resin component (A) + Reaction component (B) | Catalyst (C) |
| 9 | Base resin component (A) + Reaction component (B) | Base resin component (A) + Catalyst (C) |
| 10 | Base resin component (A) + Reaction component (B) | Reaction component (B) + Catalyst (C) |
| 11 | Catalyst (C) | Base resin component (A) + Reaction component (B) |
| 12 | Base resin component (A) + Catalyst (C) | Base resin component (A) + Reaction component (B) |

The base resin component (A), the reaction component (B) and the catalyst (C) are combined in any one of Combinations I to IV in Table 4 below. Table 4 shows the acceptor component, the donor component and the catalyst of the Michael addition reaction; and the epoxy group-containing component, the thiol group-containing component and the catalyst of the epoxythiol reaction, which are the same as previously described.

TABLE 4

| Combination | Base resin component (A) | Reaction component (B) | Catalyst (C) |
|---|---|---|---|
| I | Michael addition reaction Accepter component | Michael addition reaction Donor component | Michael addition reaction Catalyst |
| II | Michael addition reaction Donor component | Michael addition reaction Accepter component | Michael addition reaction Catalyst |
| III | Epoxythiol reaction Epoxy group-containing compound | Epoxythiol reaction Thiol group-containing compound | Epoxythiol reaction Catalyst |
| IV | Epoxythiol reaction Thiol group-containing compound | Epoxythiol reaction Epoxy group-containing compound | Epoxythiol reaction Catalyst |

In the above steps of immersing in the order of the first solution bath, the second solution bath and the third solution bath, other steps (such as water washing, drying or immersing) may be put between or before and after the steps. For example, a water washing step may be provided after each of the steps so that each of the components does not mix into the solution bath of the following step. The water washing step may use pure water, clean water, industrial water, ultrafiltrate (UF filtrate), reverse osmosis permeate water (RO water) or the like. The water washing may be performed once or several times. A method for the water washing may be immersing, showering, spraying or the like selected without particular limitation, any of which can be preferably used.

Note that, when the cationic electrodeposition coating material is a coating material curable by Michael addition reaction, it is preferable that catalyst (C) is contained in a solution bath different from the Michael addition reaction donor component, from the viewpoint of the stability of the coating material. Without wishing to be bound by any particular theory, this is because the catalyst (C) seems to start Michael addition reaction by abstracting a hydrogen ion from the donor component.

Among the combinations of Tables 3 and 4 described above, combinations 1-I, 2-II, 4-II, 5-I, 8-I, 8-II are preferable.

The catalyst (C) is preferably contained in the second solution bath. This is to prevent the catalyst (C) from mixing into the other solution bath (the first solution bath) as much as possible. Among the combinations of Table 3 above, 2, 5, 8, 9, or 10 is preferable.

Cationic Electrodeposition Coating Material

The cationic electrodeposition coating material used in this disclosure is a coating material in which the base resin component, its reaction component and the curing catalyst are separately present in the two or three solution baths, thereby achieving both of the low-temperature curability and the storage stability (bath stability). Especially, this coating material is effective for the storage stability of the cationic electrodeposition coating material which reacts to cure at 0 to 130° C. (preferably 5 to 100° C., more preferably 10 to 80° C.).

The cationic electrodeposition coating material used in this disclosure may contain, as appropriate, pigment dispersion pastes; various resins (acrylic, epoxy, urethane, blocked isocyanate and melamine resins); various additives (surfactants, surface conditioners, neutralizers); solvents; and the like, in addition to the base resin component (A), the reaction component (B) and the catalyst (C), which are essential components. These may be contained in any solution bath.

The pigment dispersion pastes are prepared by dispersing pigments such as coloring pigments, rust-preventive pigments and extender pigments in fine particles in advance; and blending with various additives such as pigment dispersing resins, pigments and neutralizers to be subject to dispersion treatment in a dispersing mixer such as a ball mill, a sand mill or a pebble mill.

The pigment dispersing resin may be any known resin selected without particular limitation. Examples thereof include: epoxy or acrylic resins having hydroxyl and cationic groups; tertiary amine type epoxy resins; quaternary ammonium salt type epoxy resins; tertiary sulfonium salt type epoxy resins; tertiary amine type acrylic resins; quaternary ammonium salt type acrylic resins; and tertiary sulfonium salt type acrylic resins.

The pigments may be any known pigment selected without particular limitation. For example, it is possible to add coloring pigments such as titanium oxide, carbon black and bengara; and extender pigments such as clay, mica, baryta, calcium carbonate and silica; antirust pigments; and the like.

The blending quantity of the pigments in the pigment dispersion paste is preferably within a range of 1 to 100 parts by mass, particularly 10 to 50 parts by mass, per 100 parts by mass of the resin solids of the cationic electrodeposition coating material. Here, the 100 parts by mass of the resin solids is the sum of the resin solids of the two or three solution baths.

The cationic electrodeposition coating material used in this disclosure preferably contains 50% by mass or more, preferably 70% by mass or more, more preferably 90% by mass or more of water in each solvent of the solution baths.

In the cationic electrodeposition coating material used in this disclosure, the content ratio between the Michael donor component (active hydrogen group) and the acceptor component ($\alpha,\beta$-unsaturated carbonyl group) as well as the content ratio between the epoxy group and the thiol group (mercapto group) are usually 0.5/1 to 1/0.5, preferably 0.7/1 to 1/0.7 in terms of the reactive functional group ratio (molar ratio). This is preferable to obtain a coated article having good storage stability, finished appearance and corrosion resistance.

The resin of the cationic electrodeposition coating material preferably has an amine vale that is usually within a range of 5 to 200 mgKOH/g, preferably 10 to 150 mgKOH/g, based on the resin solids (calculated by summing the resin solids of the two or three solution baths). If the blending ratio is out of the above ranges, the coating properties or the coating film performance may be impaired, which is not preferable.

In particular, in the solution bath in which the cationic electrodeposition coating is performed, it is preferable that the amine value is usually within a range of 10 to 250 mgKOH/g, preferably 20 to 200 mgKOH/g, based on the resin solids from the viewpoint of the coating properties.

Method for Forming a Coating Film

The present disclosure provides a method for forming a cationic electrodeposition coating film, in which a cationic electrodeposition coating material is divided into 2 solution baths (2 steps) or 3 solution baths (3 steps), and an article to be coated is immersed therein. The method includes a step of applying a current in at least one of the solution baths using the article to be coated as a cathode.

Examples of the article to be coated of the coating method for the cationic electrodeposition coating material of the present disclosure include automobile bodies, two-wheeled vehicle parts, household appliances and other appliances. The article to be coated is not particularly limited, as long as it contains a metal.

Examples of a metal steel sheet as the article to be coated include: cold-rolled steel sheets, alloyed hot-dip galvanized steel sheets, electrogalvanized steel sheets, electrolytic zinc-iron bilayer plated steel sheets, organic composite-plated steel sheets, aluminum materials, magnesium materials and the like; and those obtained from these metal sheets which have been subject to: a surface cleansing such as alkali-defatting as required; and a subsequent surface treatment such as phosphate chemical conversion treatment, chromate treatment and complex oxide treatment.

Generally in the method for cationic electrodeposition, a cationic electrodeposition coating material is diluted with deionized water or the like to a solid concentration of about 5 to 40% by mass, preferably 10 to 25% by mass; and adjusted such that the pH falls within the range of 4.0 to 9.0, preferably 5.5 to 7.0. This coating material (a part of the coating material in the present disclosure) is used as a bath. The bath is usually adjusted to have a bath temperature of 15 to 35° C. A current is applied using the article to be coated as the cathode under the conditions where the load voltage is within 100 to 400V, preferably 150 to 350V.

The thickness of the coating film is not particularly limited. However, it may generally be within a range of 5 to 40 μm, preferably 10 to 30 μm, based on a dry coating film.

The baking and drying of the coating film is generally performed at a temperature on the surface of the article to be coated which is higher than 160° C. and lower than 200° C. by using heating and drying equipment such as an electric hot air dryer or a gas hot air dryer. In the present disclosure, it is preferable that the temperature is usually 0 to 130° C., preferably 5 to 130° C., and more preferably 10 to 80° C. from the viewpoint of energy cost reduction.

The baking time is usually 10 to 180 minutes, preferably 20 to 50 minutes. The baking and drying thus provide a cured coating film.

Further, the heating and drying equipment in this disclosure may be electromagnetic-induction heating from the viewpoint of reducing energy costs and shortening its process time. When the electromagnetic-induction heating is used, the temperature of the surface of the article to be coated is the same as described above (usually 0 to 130° C., preferably 5 to 130° C., more preferably 10 to 80° C.). However, the baking time is usually 1 to 15 minutes, preferably 1 to 12 minutes, and more preferably 1 to 9 minutes.

In the surface layer and the back layer of the cured cationic electrodeposition coating film, when the catalyst (C) present in the surface layer is set as 100% by mass, the catalyst (C) present in the back layer is preferably 50% by mass or more from the viewpoint of curability.

EXAMPLES

Hereinafter, the present disclosure will be further described by way of Examples and Comparative Examples.

Methods for polymerization of various resins, methods for manufacturing coating material substances, methods for evaluation tests and the like are the methods conventionally known in the art. However, the present disclosure is not limited thereto. Various modifications and variations are possible within the equivalent range of the technical idea and the scope of the claims of the present disclosure. In the following examples, the term "parts" indicates parts by mass, and the symbol "%" indicates mass %.

Manufacturing Example 1: Active Hydrogen Group-Containing Epoxy Resin

In a flask equipped with a stirrer, a thermometer, a nitrogen introducing tube and a reflux condenser, 400 parts of bisphenol A and 0.2 parts of dimethylbenzylamine were added to 1000 parts of jER828EL (trade name, manufactured by Mitsubishi Chemical Co., Ltd.; epoxy resin, epoxy equivalent weight 190; number average molecular weight 370). The mixture was reacted at 130° C. until reaching the epoxy equivalent weight of 700. Next, 73 parts of diethylamine was added and reacted at 120° C. for 4 hours. Further, 102 parts of acetoacetic acid was added and reacted for 4 hours. The product of the reactions was adjusted with ethylene glycol monobutyl ether to obtain an active hydrogen group-containing epoxy resin solution having a solids content of 80%. The active hydrogen group-containing epoxy resin had an amine value of 36 mgKOH/g.

Manufacturing Example 2: Epoxy Resin with α, β-Unsaturated Carbonyl Groups

In a flask equipped with a stirrer, a thermometer, a nitrogen introducing tube, and a reflux condenser, 790 parts of adducts of hydrogenated bisphenol A and maleic acid (a compound obtained by adding 2 mol of maleic acid to 1 mol of hydrogenated bisphenol A); 1000 parts of jER828EL (trade name, manufactured by Mitsubishi Chemical Co., Ltd.; epoxy resin, epoxy equivalent weight 190; number average molecular weight 370); and 0.2 parts of dimethylbenzylamine were added and reacted at 130° C. for 5 hours. Next, 178 parts of diethylamine was added and reacted at 120° C. for 4 hours. The product of these reactions was adjusted with ethylene glycol monobutyl ether to obtain an α, β-unsaturated carbonyl group-having epoxy resin solution having a solids content of 80%. The α, β-unsaturated carbonyl group-having epoxy resin had an amine value of 78 mgKOH/g.

Manufacturing Example 3: Amino Group-Containing Epoxy Resin

In a flask equipped with a stirrer, a thermometer and a reflux condenser, 500 parts of bisphenol A and 0.2 parts of dimethylbenzylamine were added to 1200 parts of jER828EL (trade name, manufactured by Mitsubishi Chemical Co., Ltd.; epoxy resin, epoxy equivalent weight 190; number average molecular weight 370). The mixture was reacted at 130° C. until reaching the epoxy equivalent weight of 850. Next, 160 parts of diethanolamine and 65 parts of ketiminated products of diethylenetriamine and methyl isobutyl ketone were added and reacted at 120° C. for 4 hours. Then, 480 g of ethylene glycol monobutyl ether was added to obtain an amino group-containing epoxy resin solution having a solids content of 80%. The amino group-containing epoxy resin had an amine value of 59 mgKOH/g.

Manufacturing Example 4: Epoxy Resin Added Catalyst

In a flask equipped with a stirrer, a thermometer and a reflux condenser, 370 parts of jER828EL (trade name, manufactured by Mitsubishi Chemical Co., Ltd.; epoxy resin, epoxy equivalent weight 190; number average molecular weight 370), 230 parts of 1,1,3,3-tetramethylguanidine, and 500 parts of isobutyl methyl ketone were added. The mixture was heated to 120° C., and reacted for 5 hours. Then, isobutyl methyl ketone was added to prepare a solid component to obtain a catalytic solution having a solids content of 50%.

Manufacturing Example 5: Cationic Emulsifier

In a flask equipped with a stirrer, a thermometer, a nitrogen introducing tube and a reflux condenser, 137 parts of bisphenol A and 0.2 parts of dimethylbenzylamine were added to 608 parts of jER828EL (trade name, manufactured by Mitsubishi Chemical Co., Ltd.; epoxy resin, epoxy equivalent weight 190; number average molecular weight 370). The mixture was reacted at 130° C. until reaching the epoxy equivalent weight of 370. Next, 126 parts of diethanolamine and 160 parts of ketiminated products of diethylenetriamine and methyl isobutyl ketone were added and reacted at 120° C. for 4 hours. Then, 370 parts of 10% formic acid and ethylene glycol monobutyl ether were added to obtain a cationic emulsifier solution having a solids content of 80% (amine value: 180).

Manufacturing Example 6: Blocked Polyisocyanate Curing Agent

In a reaction vessel, 270 parts of Cosmonate M-200 (trade name, manufactured by Mitsui Chemical Co., Ltd., crude MDI) and 127 parts of methyl isobutyl ketone were added. The mixture was heated to 70° C. Into this, 236 parts of ethylene glycol monobutyl ether was added dropwise over 1 hour. Then, the mixture was heated to 100° C. While maintaining this temperature, the mixture was sampled over time for the IR absorption spectrum measurement. Thus, it was confirmed that the absorption of the unreacted isocyanate group had ceased, thereby obtaining a blocked polyisocyanate curing agent having a resin solids content of 80%.

Manufacturing Example 7: Pigment Dispersion Resin

In a flask equipped with an agitator, a thermometer, a drip funnel and a reflux condenser, 390 parts of bisphenol A, 240 parts of PLACCEL 212 (trade name, polycaprolactone diol, Daicel Corporation, weight average molecular weight: about 1,250) and 0.2 parts of dimethylbenzylamine were added to 1010 parts of jER828EL (trade name, epoxy resin manufactured by Japan Epoxy Resin Co., Ltd., epoxy equivalent weight 190, number average molecular weight 350). The mixture was reacted at 130° C. until reaching the epoxy equivalent weight of 1090. Next, 134 parts of dimethylethanolamine and 150 parts of an aqueous lactic acid solution having a concentration of 90% were added. The mixture was reacted at 90° C. until the epoxy groups disappeared. Then, propylene glycol monomethyl ether was added to prepare the solids content to obtain a resin for pigment dispersion containing a quaternary ammonium base having a solids content of 60%.

Manufacturing Example 8: Pigment Dispersion Paste No. 1

8.3 parts of the resin solution for pigment dispersion of Manufacturing Example 7 (5 parts of the solids content), 14.5 parts of Titanium Oxide, 9.0 parts of purified clay, 0.3 parts of carbon black, and 20.3 parts of deionized water were added and dispersed in a ball mill for 20 hours to obtain a pigment dispersion paste No. 1 having a solids content of 55%.

Manufacturing Example 9: Pigment Dispersion Paste No. 2

8.3 parts of the resin solution for pigment dispersion of Manufacturing Example 7 (5 parts of the solids content), 14.5 parts of Titanium Oxide, 7.0 parts of purified clay, 0.3 parts of carbon black, 1 parts of dioctyltin oxide, 1 parts of bismuth hydroxide, and 20.3 parts of deionized water were added and dispersed in a ball mill for 20 hours to obtain a pigment dispersion paste No. 2 having a solids content of 55%.

Manufacturing of Cationic Electrodeposition Coating Material

Manufacturing Example 10

125 parts of the epoxy resin having an α, β-unsaturated carbonyl group (100 parts of the solids content) obtained in Manufacturing Example 2, and 13 parts of 10% acetic acid were blended and uniformly stirred. Then, deionized water was added dropwise under strong stirring for about 15 minutes to obtain an emulsion having a solids content of 34%.

Next, 294 parts of the emulsion (100 parts of the solids content), 52.4 parts of the pigment dispersion paste No. 1 obtained in Manufacturing Example 8, and 350 parts of deionized water were added to manufacture a cationic electrodeposition coating material X-1 having a solids content of 20%.

Manufacturing Example 11

125 parts of the active hydrogen group-containing epoxy resin (100 parts of the solids content) obtained in Manufacturing Example 1, and 13 parts of 10% acetic acid were blended and uniformly stirred. Then, deionized water was added dropwise under strong stirring for about 15 minutes to obtain an emulsion having a solids content of 34%.

Next, 294 parts of the emulsion (100 parts of the solids content), 52.4 parts of the pigment dispersion paste No. 1 obtained in Manufacturing Example 8, and 350 parts of deionized water were added to manufacture a cationic electrodeposition coating material X-2 having a solids content of 20%.

Manufacturing Example 12

112.5 parts of the active hydrogen group-containing epoxy resin (90 parts of the solids content) obtained in Manufacturing Example 1, and 20 parts of the amine catalytic solution (10 parts of the solids content) obtained in Manufacturing Example 4 were mixed. Further, 13 parts of 10% acetic acid was blended and uniformly stirred. Then deionized water was added dropwise under strong stirring for about 15 minutes to obtain an emulsion having a solids content of 34%.

Next, 294 parts of the emulsion (100 parts of the solids content), 52.4 parts of the pigment dispersion paste No. 1 obtained in Manufacturing Example 8, and 350 parts of deionized water were added to manufacture a cationic electrodeposition coating material X-3 having a solids content of 20%.

Manufacturing Example 13

62.5 parts of the active hydrogen group-containing epoxy resin (50 parts of the solids content) obtained in Manufacturing Example 1, and 62.5 parts of the epoxy resin having an α, β-unsaturated carbonyl group (50 parts of the solids content) obtained in Manufacturing Example 2 were mixed. Further, 13 parts of 10% acetic acid was blended and uniformly stirred. Then deionized water was added dropwise under strong stirring for about 15 minutes to obtain an emulsion having a solids content of 34%.

Next, 294 parts of the emulsion (100 parts of the solids content), 52.4 parts of the pigment dispersion paste No. 1 obtained in Manufacturing Example 8, and 350 parts of deionized water were added to manufacture a cationic electrodeposition coating material X-4 having a solids content of 20%.

Manufacturing Example 14

56.3 parts of the active hydrogen group-containing epoxy resin (45 parts of the solids content) obtained in Manufacturing Example 1, 56.3 parts of the epoxy resin having an α, β-unsaturated carbonyl group (45 parts of the solids content) obtained in Manufacturing Example 2, and 20 parts of the amine catalyst solution (10 parts of the solids content) obtained in Manufacturing Example 4 were mixed. Further, 13 parts of 10% acetic acid was blended and uniformly stirred. Then deionized water was added dropwise under strong stirring for about 15 minutes to obtain an emulsion having a solids content of 34%.

Next, 294 parts of the emulsion (100 parts of the solids content), 52.4 parts of the pigment dispersion paste No. 1 obtained in Manufacturing Example 8, and 350 parts of deionized water were added to manufacture a cationic electrodeposition coating material X-5 having a solids content of 20%.

Manufacturing Example 15

90 parts of jER828EL (trade name, manufactured by Mitsubishi Chemical Co., Ltd., epoxy resin, epoxy equivalent weight 190, number average molecular weight 370) (90 parts of the solids content), 20 parts of ethylene glycol monobutyl ether, and 12.5 parts of the cationic emulsifier solution (10 parts of the solids content) obtained in Manufacturing Example 5 were mixed. Further, 13 parts of 10% acetic acid was blended and uniformly stirred. Then deionized water was added dropwise under strong stirring for about 15 minutes to obtain an emulsion having a solids content of 34%.

Next, 294 parts of the emulsion (100 parts of the solids content), 52.4 parts of the pigment dispersion paste No. 1 obtained in Manufacturing Example 8, and 350 parts of deionized water were added to manufacture a cationic electrodeposition coating material X-6 having a solids content of 20%.

Manufacturing Example 16

12.5 parts of the cationic emulsifier solution (10 parts of the solids content) obtained in Manufacturing Example 5, 90 parts of Karenz MT PEI [trade name, manufactured by Showa Denko Co., Ltd., polyfunctional thiol compound, pentaerythritol tetrakis(3-mercaptobutyrate)] (90 parts of the solids content), and 13 parts of 10% acetic acid were blended and uniformly stirred. Then, deionized water was added dropwise under strong stirring for about 15 minutes to obtain an emulsion having a solids content of 34%.

Next, 294 parts of the emulsion (100 parts of the solids content), 52.4 parts of the pigment dispersion paste No. 1 obtained in Manufacturing Example 8, and 350 parts of deionized water were added to manufacture a cationic electrodeposition coating material X-7 having a solids content of 20%.

Manufacturing Example 17

20 parts of the amine catalytic solution (10 parts of the solids content) obtained in Manufacturing Example 4, 90 parts of Karenz MT PEI (90 parts of the solids content) [trade name, manufactured by Showa Denko Co., Ltd., polyfunctional thiol compound, pentaerythritol tetrakis(3-mercaptobutyrate)], and 13 parts of 10% acetic acid were blended and uniformly stirred. Then, deionized water was added dropwise under strong stirring for about 15 minutes to obtain an emulsion having a solids content of 34%.

Next, 294 parts of the emulsion (100 parts of the solids content), 52.4 parts of the pigment dispersion paste No. 1 obtained in Manufacturing Example 8, and 350 parts of deionized water were added to manufacture a cationic electrodeposition coating material X-8 having a solids content of 20%.

Manufacturing Example 18

60 parts of jER828EL (60 parts of the solids content) (trade name, manufactured by Mitsubishi Chemical Co., Ltd., epoxy resin, epoxy equivalent weight 190, number average molecular weight 370), 20 parts of the amine catalytic solution (10 parts of the solids content) obtained in Manufacturing Example 4, 30 parts of Karenz MT PEI (30 parts of the solids content) [trade name, manufactured by Showa Denko Co., Ltd., polyfunctional thiol compound, pentaerythritol tetrakis(3-mercaptobutyrate)], and 13 parts of 10% acetic acid were blended and uniformly stirred. Then, deionized water was added dropwise under strong stirring for about 15 minutes to obtain an emulsion having a solids content of 34%.

Next, 294 parts of the emulsion (100 parts of the solids content), 52.4 parts of the pigment dispersion paste No. 1 obtained in Manufacturing Example 8, and 350 parts of deionized water were added to manufacture a cationic electrodeposition coating material X-9 having a solids content of 20%.

Manufacturing Example 19

200 parts of the amine catalytic solution (100 parts of the solids content) obtained in Manufacturing Example 4, and 13 parts of 10% acetic acid were blended and uniformly stirred. Then, deionized water was added dropwise under strong stirring for about 15 minutes to obtain an emulsion having a solids content of 34%.

Next, 294 parts of the emulsion (100 parts of the solids content), 52.4 parts of the pigment dispersion paste No. 1 obtained in Manufacturing Example 8, and 350 parts of deionized water were added to manufacture a cationic electrodeposition coating material X-10 having a solids content of 20%.

Manufacturing Example 20

87.5 parts of the amino group-containing epoxy resin solution (70 parts of the solids content) obtained in Manufacturing Example 3, and 37.5 parts of the blocked polyisocyanate curing agent (30 parts of the solids content) obtained in Manufacturing Example 6 were mixed. Further, 13 parts of 10% acetic acid was blended and uniformly stirred. Then deionized water was added dropwise under strong stirring for about 15 minutes to obtain an emulsion having a solids content of 34%.

Next, 294 parts of the emulsion (100 parts of the solids content), 52.4 parts of the pigment dispersion paste No. 2 obtained in Manufacturing Example 9, and 350 parts of deionized water were added to manufacture a cationic electrodeposition coating material X-11 having a solids content of 20%.

Coating Method for Cationic Electrodeposition

Example 1

Chemical conversion treatment (trade name, Palbond #3020, manufactured by Nihon Parkerizing Co., Ltd., zinc phosphate treatment agent) was applied to a cold-rolled steel plate (150 mm (long)×70 mm (wide)×0.8 mm (thick)) as an article to be coated. Electrodeposition coating was performed using the cationic electrodeposition coating material X-1 obtained in Manufacturing Example 10 so that the thickness of a dry film would be 8 µm. Then, the surface of the coated plate was washed by showering with pure water. Electrodeposition coating was performed using the cationic electrodeposition coating material X-3 obtained in Manufacturing Example 12 so that the thickness of a dry film of the multi-layered coating film would be 16 µm. Lastly, the surface of the coated plate was washed by showering with pure water, and was baked and dried at 100° C. for 20 minutes to obtain an electrodeposition-coated plate Y-1.

Example 2

Chemical conversion treatment (trade name, Palbond #3020, manufactured by Nihon Parkerizing Co., Ltd., zinc phosphate treatment agent) was applied to a cold-rolled steel plate (150 mm (long)×70 mm (wide)×0.8 mm (thick)) as an article to be coated. Electrodeposition coating was performed using the cationic electrodeposition coating material X-3 obtained in Manufacturing Example 12 so that the thickness of a dry film would be 8 µm. Then, the surface of the coated plate was washed by showering with pure water. Electrodeposition coating was performed using the cationic electrodeposition coating material X-1 obtained in Manufacturing Example 10 so that the thickness of a dry film of the multi-layered coating film would be 16 µm. Lastly, the surface of the coated plate was washed by showering with pure water, and was baked and dried at 100° C. for 20 minutes to obtain an electrodeposition-coated plate Y-2.

Example 3

Chemical conversion treatment (trade name, Palbond #3020, manufactured by Nihon Parkerizing Co., Ltd., zinc phosphate treatment agent) was applied to a cold-rolled steel plate (150 mm (long)×70 mm (wide)×0.8 mm (thick)) as an article to be coated. Electrodeposition coating was performed using the cationic electrodeposition coating material X-4 obtained in Manufacturing Example 13 so that the thickness of a dry film would be 14 µm. Then, the surface of the coated plate was washed by showering with pure water. Electrodeposition coating was performed using the cationic electrodeposition coating material X-10 obtained in Manufacturing Example 19 so that the thickness of a dry film of the multi-layered coating film would be 16 µm. Lastly, the surface of the coated plate was washed by showering with pure water, and was baked and dried at 100° C. for 20 minutes to obtain an electrodeposition-coated plate Y-3.

Example 4

Chemical conversion treatment (trade name, Palbond #3020, manufactured by Nihon Parkerizing Co., Ltd., zinc phosphate treatment agent) was applied to a cold-rolled steel plate (150 mm (long)×70 mm (wide)×0.8 mm (thick)) as an article to be coated. Electrodeposition coating was performed using the cationic electrodeposition coating material X-4 obtained in Manufacturing Example 13 so that the thickness of a dry film would be 16 µm. Then, the surface of the coated plate was washed by showering with pure water, and was immersed in a 1,1,3,3-tetramethylguanidine (TMG) solution of 5% for 5 minutes. Lastly, the surface of the coated plate was washed by showering with pure water, and was baked and dried at 100° C. for 20 minutes to obtain an electrodeposition-coated plate Y-4.

Example 5

Chemical conversion treatment (trade name, Palbond #3020, manufactured by Nihon Parkerizing Co., Ltd., zinc phosphate treatment agent) was applied to a cold-rolled steel plate (150 mm (long)×70 mm (wide)×0.8 mm (thick)) as an article to be coated.

Electrodeposition coating was performed using the cationic electrodeposition coating material X-1 obtained in Manufacturing Example 10 so that the thickness of a dry film would be 7 µm. Then, the surface of the coated plate was washed by showering with pure water. Electrodeposition coating was performed using the cationic electrodeposition coating material X-2 obtained in Manufacturing Example 11 so that the thickness of a dry film of the multi-layered coating film of two layers would be 14 µm. Then, the surface of the coated plate was washed by showering with pure water. Electrodeposition coating was performed using the cationic electrodeposition coating material X-10 obtained in Manufacturing Example 19 so that the thickness of a dry film of the multi-layered coating film of three layers would be 16 μm. Lastly, the surface of the coated plate was washed by showering with pure water, and was baked and dried at 100° C. for 20 minutes to obtain an electrodeposition-coated plate Y-5.

Example 6

Chemical conversion treatment (trade name, Palbond #3020, manufactured by Nihon Parkerizing Co., Ltd., zinc phosphate treatment agent) was applied to a cold-rolled steel plate (150 mm (long)×70 mm (wide)×0.8 mm (thick)) as an article to be coated. Electrodeposition coating was performed using the cationic electrodeposition coating material X-2 obtained in Manufacturing Example 11 so that the thickness of a dry film would be 7 μm. Then, the surface of the coated plate was washed by showering with pure water. Electrodeposition coating was performed using the cationic electrodeposition coating material X-1 obtained in Manufacturing Example 10 so that the thickness of a dry film of the multi-layered coating film of two layers would be 14 μm. Then, the coated plate surface was washed by showering with pure water, and was coated by electrodeposition using the cationic electrodeposition coating material X-10 obtained in Manufacturing Example 19 so that the thickness of a dried film of the multitiered coating film of three layers would be 16 μm. Lastly, the surface of the coated plate was washed by showering with pure water, and was baked and dried at 100° C. for 20 minutes to obtain an electrodeposition-coated plate Y-6.

Example 7

Chemical conversion treatment (trade name, Palbond #3020, manufactured by Nihon Parkerizing Co., Ltd., zinc phosphate treatment agent) was applied to a cold-rolled steel plate (150 mm (long)×70 mm (wide)×0.8 mm (thick)) as an article to be coated. Electrodeposition coating was performed using the cationic electrodeposition coating material X-6 obtained in Manufacturing Example 15 so that the thickness of a dry film would be 11 μm. Then, the surface of the coated plate was washed by showering with pure water. Electrodeposition coating was performed using the cationic electrodeposition coating material X-8 obtained in Manufacturing Example 17 so that the thickness of a dry film of the multi-layered coating film would be 16 μm. Lastly, the surface of the coated plate was washed by showering with pure water, and was baked and dried at 100° C. for 20 minutes to obtain an electrodeposition-coated plate Y-7.

Example 8

Chemical conversion treatment (trade name, Palbond #3020, manufactured by Nihon Parkerizing Co., Ltd., zinc phosphate treatment agent) was applied to a cold-rolled steel plate (150 mm (long)×70 mm (wide)×0.8 mm (thick)) as an article to be coated.
Electrodeposition coating was performed using the cationic electrodeposition coating material X-6 obtained in Manufacturing Example 15 so that the thickness of a dry film would be 10 μm. Then, the surface of the coated plate was washed by showering with pure water. Electrodeposition coating was performed using the cationic electrodeposition coating material X-7 obtained in Manufacturing Example 16 so that the thickness of a dry film of the multi-layered coating film of two layers would be 14 μm. Then, the surface of the coated plate was washed by showering with pure water. Electrodeposition coating was performed using the cationic electrodeposition coating material X-10 obtained in Manufacturing Example 19 so that the thickness of a dry film of the multi-layered coating film of three layers would be of 16 μm. Lastly, the surface of the coated plate was washed by showering with pure water, and was baked and dried at 100° C. for 20 minutes to obtain an electrodeposition-coated plate Y-8.

Comparative Example 1

Chemical conversion treatment (trade name, Palbond #3020, manufactured by Nihon Parkerizing Co., Ltd., zinc phosphate treatment agent) was applied to a cold-rolled steel plate (150 mm (long)×70 mm (wide)×0.8 mm (thick)) as an article to be coated.
Electrodeposition coating was performed using the cationic electrodeposition coating material X-5 obtained in Manufacturing Example 14 so that the thickness of a dry film would be 16 μm. Then, this coated plate surface was washed by showering with pure water, and was dried by baking at 100° C. for 20 minutes to obtain an electrodeposition-coated plate Y-9.

Comparative Example 2

Chemical conversion treatment (trade name, Palbond #3020, manufactured by Nihon Parkerizing Co., Ltd., zinc phosphate treatment agent) was applied to a cold-rolled steel plate (150 mm (long)×70 mm (wide)×0.8 mm (thick)) as an article to be coated.
Electrodeposition coating was performed using the cationic electrodeposition coating material X-4 obtained in Manufacturing Example 13 so that the thickness of a dry film would be 16 μm. Then, this coated plate surface was washed by showering with pure water, and was dried by baking at 100° C. for 20 minutes to obtain an electrodeposition-coated plate Y-10.

Comparative Example 3

Chemical conversion treatment (trade name, Palbond #3020, manufactured by Nihon Parkerizing Co., Ltd., zinc phosphate treatment agent) was applied to a cold-rolled steel plate (150 mm (long)×70 mm (wide)×0.8 mm (thick)) as an article to be coated. Electrodeposition coating was performed using the cationic electrodeposition coating material X-9 obtained in Manufacturing Example 18 so that the thickness of a dry film would be of 16 μm. Then, this coated plate surface was washed by showering with pure water, and was dried by baking at 100° C. for 20 minutes to obtain an electrodeposition-coated plate Y-11.

Comparative Example 4

Chemical conversion treatment (trade name, Palbond #3020, manufactured by Nihon Parkerizing Co., Ltd., zinc phosphate treatment agent) was applied to a cold-rolled steel plate (150 mm (long)×70 mm (wide)×0.8 mm (thick)) as an article to be coated. Electrodeposition coating was performed using the cationic electrodeposition coating material X-11 obtained in Manufacturing Example 20 so that the thickness of a dry film would be 16 μm. Then, this coated plate surface was washed by showering with pure water, and was dried by baking at 100° C. for 20 minutes to obtain an electrodeposition-coated plate Y-12.

The coated plates obtained in the coating methods for cationic electrodeposition coating materials of the above-mentioned Examples and Comparative Examples were evaluated by an evaluation test described later. The evaluation results are shown in Table 5 below. If at least one of the two evaluation tests results in fail "D", such coating method is considered a failure.

TABLE 5

| Examples/ Comparative Examples | | Electrodeposition coating plate | Step | Coating material | | | Evaluation results | |
|---|---|---|---|---|---|---|---|---|
| | | | | (Step 1) | (Step 2) | (Step 3) | Sterability | Curability |
| Example | 1 | Y-1 | 2 steps | X-1 | X-3 | | A | A |
| | 2 | Y-2 | 2 steps | X-3 | X-1 | | B | A |
| | 3 | Y-3 | 2 steps | X-4 | X-1 | | B | A |
| | 4 | Y-4 | 2 steps | X-4 | TMG (Note 1) | | B | C |
| | 5 | Y-5 | 3 steps | X-1 | X-2 | X-10 | A | A |
| | 6 | Y-6 | 3 steps | X-2 | X-1 | X-10 | A | A |
| | 7 | Y-7 | 2 steps | X-6 | X-8 | | A | A |
| | 8 | Y-8 | 3 steps | X-6 | X-7 | X-10 | A | A |
| Comparative Example | 1 | Y-9 | 1 steps | X-5 | | | D | A |
| | 2 | Y-10 | 1 steps | X-4 | | | B | D |
| | 3 | Y-11 | 1 steps | X-9 | | | D | A |
| | 4 | Y-12 | 1 steps | X-11 | | | A | D |

(Note 1)
The article to be coated was immersed in a TMG aqueous solution of 5% (it was not coated by electrodeposition).

Evaluation Tests

Storability (Loss of Luster/Formation of Seeds)

The cationic electrodeposition coating materials (one to three kinds of coating materials) used in Examples and Comparative Examples were stored at the temperature of 30° C. for 3 months. During that time, coating plates were prepared using each coating method of Examples and Comparative Examples at a rate of 10 times every week. A comparison was made between the surfaces of the coating plates prepared at the beginning and after the three-month storage. Evaluations were made according to the following criteria. The evaluations A to C represent pass, while the evaluation D represents fail.
  A: Compared to the initial coating plate, the coating plate prepared after the storage showed no difference.
  B: Compared to the initial coating plate, the coating plate prepared after the storage slightly showed loss of luster.
  C: Compared to the initial coating plate, the coating plate prepared after the storage showed loss of luster.
  D: Compared to the initial coating sheet, the coating plate prepared after the storage showed loss of luster and formation of seeds.

Curability (Rubbing Properties)

The cationic electrodeposition coating materials (including a pigment) obtained in the Examples and Comparative Examples were applied on glass plates with an applicator such that the thickness of a dried coating film would be 15 μm; and heated at the temperature of 120° C. for 30 minutes. After reciprocating gauze impregnated with acetone on each coating film five times with a load of 500 g, the conditions of the gauze and the coating film were evaluated based on the criteria described below. The evaluations A to C represent pass, while the evaluation D represents fail.
  A: Neither exposure of the substrate nor transfer of the pigment to the gauze is confirmed.
  B: Exposure of the substrate is not confirmed, while transfer of the pigment to the gauze is slightly confirmed.
  C: Exposure of the substrate is not confirmed, while transfer of the pigment to the gauze is somewhat confirmed.
  D: Transfer of the pigment to the gauze is remarkable, and exposure of the substrate is confirmed.

The invention claimed is:

1. A coating method for a cationic electrodeposition coating material, wherein a metallic article to be coated is coated by cationic electrodeposition, the method comprising:
  a step of immersing the metallic article to be coated in a first solution bath;
  a step of immersing the metallic article to be coated in a second solution bath; and
  a step of immersing the metallic article to be coated in a third solution bath,
  wherein a coating film formed through the three steps contains at least a base resin component (A), a reaction component (B) and a catalyst (C),
  wherein the first solution bath, the second solution bath and the third solution bath contain a different one of the base resin component (A), the reaction component (B) and the catalyst (C); or the first solution bath, the second solution bath and the third solution bath contain the base resin component (A), the reaction component (B) and the catalyst (C) in a combination of two of the components and none of the first, second and third solution baths contains all of the three components at the same time,
  wherein the combination of the base resin component (A), the reaction component (B) and the catalyst (C) is respectively a Michael addition reaction acceptor component, a Michael addition reaction donor component and a Michael addition reaction catalyst: or the Michael addition reaction donor component, the Michael addition reaction acceptor component and the Michael addition reaction catalyst,
  wherein the Michael addition reaction acceptor component is an α,β-unsaturated carbonyl group-containing compound, and the Michael addition reaction donor component is an active hydrogen group-containing compound, and
  wherein a step in which the base resin component (A) is contained and a step in which the reaction component (B) is contained out of the three steps include a cationic electrodeposition coating in which a current is applied.

2. The coating method for the cationic electrodeposition coating material according to claim 1, wherein the combination of the base resin component (A), the reaction component (B) and the catalyst (C) is respectively an epoxy group-containing component, a thiol group-containing component and Ig catalyst; or the thiol group-containing component, the epoxy group-containing component and the catalyst.

3. The coating method for the cationic electrodeposition coating material according to claim 2, the method further comprising:
a step of curing the formed coating film by electromagnetic-induction heating.

4. The coating method for the cationic electrodeposition coating material according to claim 1, the method further comprising:
a step of water washing after at least one of the steps.

5. The coating method for the cationic electrodeposition coating material according to claim 4, the method further comprising:
a step of curing the formed coating film by electromagnetic-induction heating.

6. The coating method for the cationic electrodeposition coating material according to claim 1, wherein the catalyst (C) is a microencapsulated catalyst.

7. The coating method for the cationic electrodeposition coating material according to claim 6, the method further comprising:
a step of curing the formed coating film by electromagnetic-induction heating.

8. The coating method for the cationic electrodeposition coating material according to claim 1, the method further comprising:
a step of curing the formed coating film at a temperature of 130° C. or less.

9. The coating method for the cationic electrodeposition coating material according to claim 8, the method further comprising:
a step of curing the formed coating film by electromagnetic-induction heating.

10. The coating method for the cationic electrodeposition coating material according to claim 1, the method further comprising:
a step of curing the formed coating film by electromagnetic-induction heating.

11. A coating method for a cationic electrodeposition coating material, wherein a metallic article to be coated is coated by cationic electrodeposition, the method comprising:
a step of immersing the metallic article to be coated in a first solution bath; and
a step of immersing the metallic article to be coated in a second solution bath,
wherein a coating film formed through the two steps contains at least a base resin component (A), a reaction component (B) and a catalyst (C),
wherein the first solution bath contains at least one of the base resin component (A) and the reaction component (B) out of the base resin component (A), the reaction component (B) and the catalyst (C) and the second solution bath contains the other of the base resin component (A) and the reaction component (B), or at least one of the first solution bath and the second solution bath contains at least the base resin component (A) and the reaction component (B) out of the base resin component (A), the reaction component (B) and the catalyst (C), and
neither the first solution bath nor the second solution bath contains all of the three components at the same time,
wherein the combination of the base resin component (A), the reaction component (B) and the catalyst (C) is respectively a Michael addition reaction acceptor component, a Michael addition reaction donor component and a Michael addition reaction catalyst: or the Michael addition reaction donor component, the Michael addition reaction acceptor component and the Michael addition reaction catalyst,
wherein the Michael addition reaction acceptor component is an α,β-unsaturated carbonyl group-containing compound, and the Michael addition reaction donor component is an active hydrogen group-containing compound, and
wherein a step in which the base resin component (A) is contained and a step in which the reaction component (B) is contained out of the two steps include a cationic electrodeposition coating in which a current is applied.

12. The coating method for the cationic electrodeposition coating material according to claim 11, wherein the combination of the base resin component (A), the reaction component (B) and the catalyst (C) is respectively an epoxy group-containing component, a thiol group-containing component and the catalyst; or the thiol group-containing component, the epoxy group-containing component and the catalyst.

13. The coating method for the cationic electrodeposition coating material according to claim 11, the method further comprising:
a step of water washing after at least one of the steps.

14. The coating method for the cationic electrodeposition coating material according to claim 11, wherein the catalyst (C) is a microencapsulated catalyst.

15. The coating method for the cationic electrodeposition coating material according to claim 11, the method further comprising:
a step of curing the formed coating film at a temperature of 130° C. or less.

16. The coating method for the cationic electrodeposition coating material according to claim 11, the method further comprising:
a step of curing the formed coating film by electromagnetic-induction heating.

* * * * *